(12) United States Patent
Tseng et al.

(10) Patent No.: US 9,513,010 B2
(45) Date of Patent: Dec. 6, 2016

(54) GAS TURBINE ENGINE COMBUSTOR WITH FLUIDIC CONTROL OF SWIRLERS

(71) Applicant: HONEYWELL INTERNATIONAL INC., Morristown, NJ (US)

(72) Inventors: Raymond R. Tseng, Chandler, AZ (US); Frank J. Zupanc, Fountain Hills, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 605 days.

(21) Appl. No.: 13/961,223

(22) Filed: Aug. 7, 2013

(65) Prior Publication Data

US 2015/0040572 A1   Feb. 12, 2015

(51) Int. Cl.
| F23R 3/26 | (2006.01) |
| F02C 7/042 | (2006.01) |
| F02C 7/22 | (2006.01) |
| F02C 9/54 | (2006.01) |
| F23R 3/14 | (2006.01) |
| F23R 3/28 | (2006.01) |
| F23C 7/00 | (2006.01) |

(52) U.S. Cl.
CPC .............. *F23R 3/26* (2013.01); *F02C 7/042* (2013.01); *F02C 7/222* (2013.01); *F02C 9/54* (2013.01); *F23R 3/14* (2013.01); *F23R 3/286* (2013.01); *F05D 2210/33* (2013.01); *F05D 2240/35* (2013.01); *F05D 2270/18* (2013.01); *F23D 2900/00* (2013.01); *F23D 2900/14* (2013.01); *F23D 2900/14021* (2013.01); *F23D 2900/14482* (2013.01)

(58) Field of Classification Search
CPC .............. F05D 2270/18; F23D 2900/00; F23D 2900/14; F23D 2900/14482; F23D 2900/14021; F23R 3/14; F23R 3/286; F23C 7/00; F23C 7/008
See application file for complete search history.

(56) References Cited

U.S. PATENT DOCUMENTS

| 3,340,896 | A | * | 9/1967 | Mon | ....................... F01B 17/00 137/624.13 |
| 4,542,622 | A | | 9/1985 | Greene et al. | |
| 4,594,848 | A | | 6/1986 | Mongia et al. | |
| 6,389,798 | B1 | | 5/2002 | Tilston et al. | |
| 6,474,569 | B1 | | 11/2002 | Brundish et al. | |
| 6,895,758 | B2 | | 5/2005 | Knight | |
| 7,200,986 | B2 | | 4/2007 | Sanders | |

(Continued)

OTHER PUBLICATIONS

EP Extended Search Report Application No. 14170133.4 dated Dec. 11, 2014.

*Primary Examiner* — Phutthiwat Wongwian
*Assistant Examiner* — William Breazeal
(74) *Attorney, Agent, or Firm* — Lorenz & Kopf, LLP

(57) ABSTRACT

A system and method for controlling air flow through a combustor swirler assembly that includes an inner swirler and an outer swirler. A bistable fluidic amplifier that includes an air inlet, a first air outlet, a second air outlet, and a control port is disposed upstream of the combustor swirler assembly. A flow of compressed is directed into the air inlet of the bistable fluidic amplifier and, based on the control air pressure at the control port, the flow of compressed air supplied to the air inlet is selectively directed to either the first air outlet or the second air outlet.

5 Claims, 7 Drawing Sheets

(56) References Cited

U.S. PATENT DOCUMENTS

| | | |
|---|---|---|
| 7,631,500 B2 | 12/2009 | Mueller et al. |
| 7,669,421 B2 | 3/2010 | Saitoh et al. |
| 7,926,744 B2 | 4/2011 | Thomson et al. |
| 8,297,057 B2 | 10/2012 | Toon |
| 8,327,643 B2 | 12/2012 | Yamamoto et al. |
| 8,381,530 B2 | 2/2013 | Singh et al. |
| 8,413,448 B2 | 4/2013 | Hicks et al. |
| 8,429,914 B2 | 4/2013 | Gashi et al. |
| 2010/0011779 A1 | 1/2010 | Senior |
| 2010/0092901 A1* | 4/2010 | Yoshida .................. F23R 3/26 431/281 |
| 2012/0128470 A1 | 5/2012 | Goodman et al. |

* cited by examiner

GAS TURBINE ENGINE COMBUSTOR WITH FLUIDIC CONTROL OF SWIRLERS

STATEMENT REGARDING FEDERALLY SPONSORED RESEARCH OR DEVELOPMENT

This invention was made with Government support under W911W6-11-2-0013 awarded by the U.S. Army. The Government has certain rights in this invention.

TECHNICAL FIELD

The present invention generally relates to gas turbine engine combustors, and more particularly relates to a gas turbine engine combustor that includes fluidic control of swirlers.

BACKGROUND

The combustors in gas turbine engines often exhibit trade-offs between ignition and low-power operability and high-power emissions and durability. Aerodynamic flow patterns within the combustor determine, to a large extent, how the combustor performs over the full operating range of the combustor. However, it is often found that the aerodynamics associated with good ignition and low-power operability can produce increased exhaust emissions and/or high metal temperatures at high-power. Similarly, the aerodynamics associated with improved emissions and reduced metal temperatures often do not perform well during ignition and sub-idle operation.

As is generally known, many gas turbine engine combustors include swirlers. These swirlers, to a large extent impact, primary zone aerodynamics with the combustor. Thus, the ability to modulate or mode-switch between two differently configured swirlers, each optimized for either high-power or low-power (e.g., sub-idle) operation, would be of tremendous benefit in developing gas turbine combustors with substantial improvements in emissions and durability while meeting the demanding requirements for aircraft engine operability.

Moreover, it is advantageous during ignition to direct some of the fuel toward the igniter region in order to initiate the ignition process. At high-power, however, directing the fuel spray toward the igniter region may have an adverse impact on igniter durability by producing locally hot regions. It would thus be desirable to direct a portion of the fuel toward the spark region during start-up and then shift this fuel away from the igniter after ignition has occurred and high-power operation has been established, thereby reducing the local metal temperatures in this region and improving the overall durability of the igniter hardware.

Hence, there is a need for a system and method that can modulate or mode-switch between two differently configured swirlers, each optimized for either high-power or low-power (e.g., sub-idle) operation, and/or that can direct a portion of the fuel toward the spark region during start-up and then shift this fuel away from the igniter after ignition has occurred and high-power operation has been established. The present invention addresses at least these needs.

BRIEF SUMMARY

In one embodiment, a gas turbine engine combustor assembly includes an inner annular liner, an outer annular liner, a dome assembly, a plurality of fuel/air openings, a plurality of swirler assemblies, and a bistable fluidic amplifier. The outer annular liner is spaced apart from the inner annular liner, and the dome assembly is coupled between the inner and outer annular liners to define a combustion chamber. The fuel/air openings are formed in an extend through the dome assembly. Each swirler assembly is disposed within a different one of the fuel/air openings, and each swirler assembly comprises an inner swirler and an outer swirler that surrounds the inner swirler. The bistable fluidic amplifier comprises an air inlet, a first air outlet, a second air outlet, and a control port. The air inlet is adapted to receive a flow of compressed air. The first air outlet is in fluid communication with the air inlet and one of the outer swirlers. The second air outlet is in fluid communication with the air inlet and one of the inner swirlers. The control port is adapted to selectively receive a flow of control air. The bistable fluidic amplifier is responsive to control air pressure at the control port to selectively direct the flow of compressed air supplied to the air inlet to either the first air outlet or the second air outlet.

In another embodiment, a gas turbine engine includes a compressor section, a combustion section, and a turbine section disposed in flow series. The combustion section is configured to receive a flow of compressed air and a flow of control air and includes an inner annular liner, outer annular liner spaced apart from the inner annular liner, and a dome assembly coupled between the inner and outer annular liners to define a combustion chamber. The combustion section also includes a plurality of fuel/air openings, a plurality of swirler assemblies, and a plurality of bistable fluidic amplifiers. The fuel/air openings are formed in an extend through the dome assembly. Each swirler assembly is disposed within a different one of the fuel/air openings, and comprises an inner swirler and an outer swirler that surrounds the inner swirler. Each bistable fluidic amplifier comprises an air inlet, a first air outlet, a second air outlet, and a control port. The air inlet is coupled to receive the flow of compressed air, the first air outlet is in fluid communication with the air inlet and the outer swirler, the second air outlet is in fluid communication with the air inlet and the inner swirler, and the control port coupled to selectively receive the flow of control air. Each bistable fluidic amplifier is responsive to control air pressure at the control port to selectively direct the flow of compressed air supplied to the air inlet to either the first air outlet or the second air outlet.

In yet another embodiment, a method of controlling air flow through a combustor swirler assembly that includes an inner swirler and an outer swirler surrounds the inner swirler includes the steps of disposing a bistable fluidic amplifier upstream of the combustor swirler assembly. The bistable fluidic amplifier comprises an air inlet, a first air outlet, a second air outlet, and a control port. The air inlet is adapted to receive a flow of compressed air, the first air outlet is in fluid communication with the air inlet and the outer swirler, the second air outlet is in fluid communication with the air inlet and the inner swirler, and the control port is adapted to selectively receive a flow of control air. The method additionally includes directing the flow of compressed into the air inlet of the bistable fluidic amplifier and, based on the control air pressure at the control port, selectively directing the flow of compressed air supplied to the air inlet to either the first air outlet or the second air outlet.

Furthermore, other desirable features and characteristics of the combustor, engine, and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
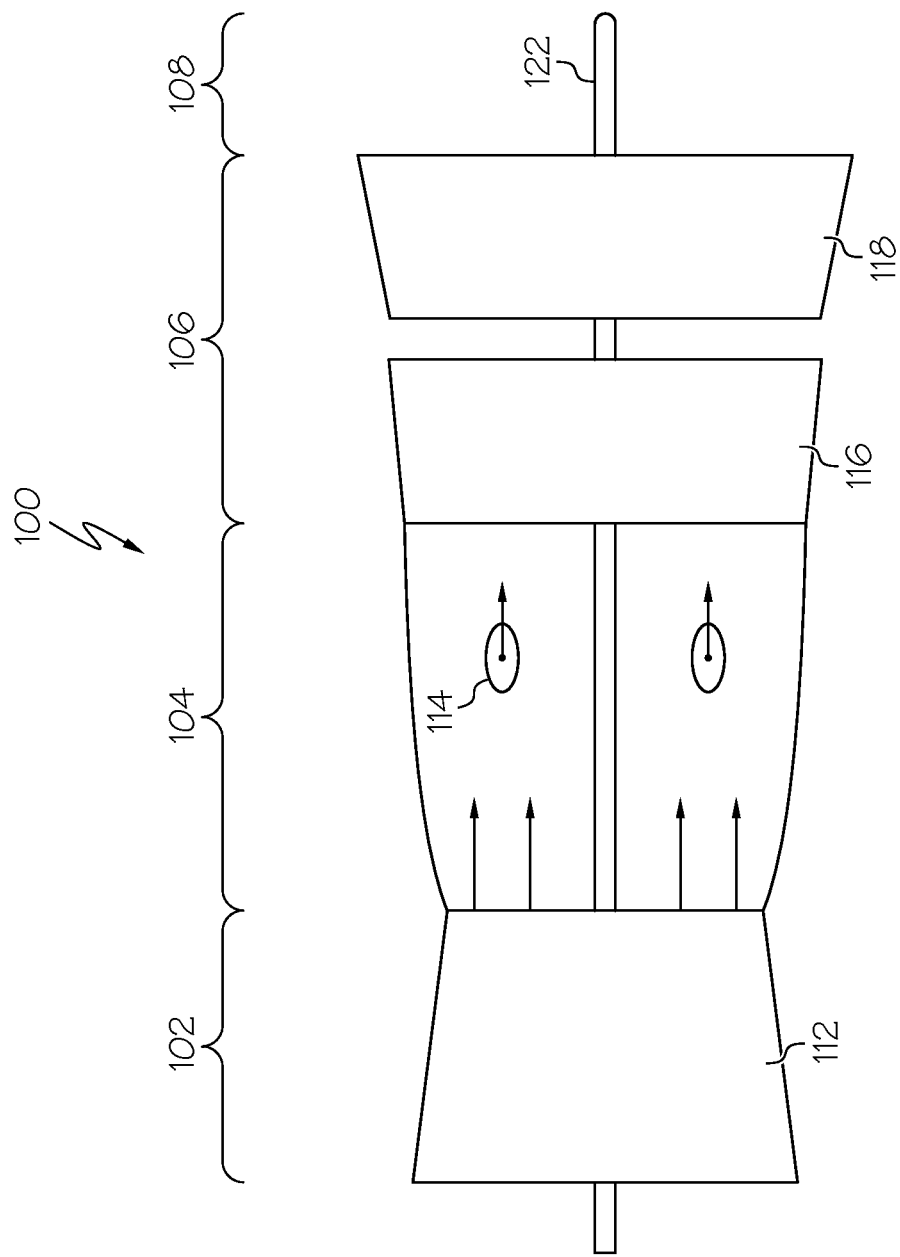
FIG. 1 depicts a functional block diagram of an exemplary gas turbine engine.

Turning now to FIG. 1, a functional block diagram of an exemplary gas turbine engine 100 is depicted. The depicted engine 100 is a single-spool turbo-shaft gas turbine propulsion engine, and includes a compressor section 102, a combustion section 104, a turbine section 106, and an exhaust section 108. The compressor section 102, which may include one or more compressors 112, draws air into the engine 100 and compresses the air to raise its pressure. In the depicted embodiment, only a single compressor 112 is shown, though it will be appreciated that one or more additional compressors could be used.

No matter the particular number of compressors 112 that are included in the compressor section 102, the compressed air is directed into the combustion section 104. In the combustion section 104, which includes a combustor assembly 114, the compressed air is mixed with fuel supplied from a non-illustrated fuel source. The fuel and air mixture is combusted, and the high energy combusted air mixture is then directed into the turbine section 106.

The turbine section 106 includes one or more turbines. In the depicted embodiment, the turbine section 106 includes two turbines, a high pressure turbine 116 and a low power turbine 118. However, it will be appreciated that the engine 100 could be configured with more or less than this number of turbines. No matter the particular number, the combusted air mixture from the combustion section 104 expands through each turbine 116, 118, causing it to rotate a power shaft 122. The combusted air mixture is then exhausted via the exhaust section 108. The power shaft 122 may be used to drive various devices within the engine or vehicle. For example, in the context of a helicopter, the power shaft may be used to drive one or more rotors.

Figure 2:
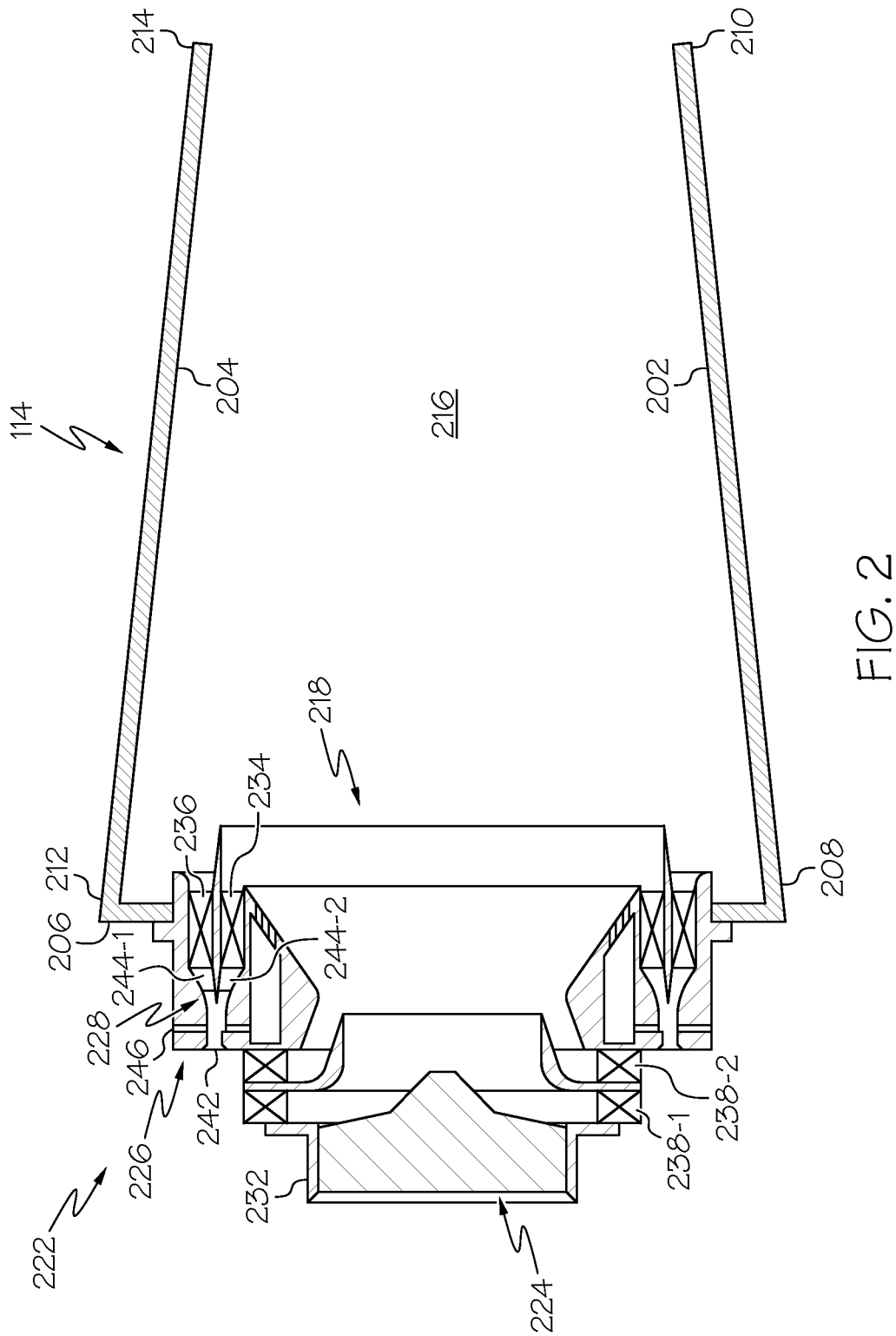
FIG. 2 depicts a simplified, close-up cross section view of a portion of a combustor assembly that may be implemented in the engine of FIG. 1.

Turning now to FIG. 2, simplified, close-up cross section view of a portion of the combustor assembly 114 is depicted. The depicted combustor assembly 114 is an annular combustor that includes an inner annular liner 202, an outer annular liner 204, and a combustor dome 206. The inner annular liner 202 includes an upstream end 208 and a downstream end 210. Similarly, the outer annular liner 204, which surrounds the inner annular liner 202, includes an upstream end 212 and a downstream end 214. It will be appreciated that the inner 202 and outer 204 annular liners may of a single-walled or a double-walled construction.

The combustor dome 206 is coupled between the upstream ends 208 and 212 of the inner 202 and outer 204 annular liners, respectively, forming a combustion chamber 216 between the inner 202 and outer 204 liners. A plurality of fuel/air openings 218 are formed in and extend through the dome assembly 206. It will be appreciated that, for clarity, only one fuel/air opening 218 is depicted in FIG. 2. Regardless of the number of fuel/air openings 218, a plurality of fuel injector assemblies 222 (only one shown) are coupled to the combustor dome 206. Each fuel injector assembly 222 is associated with a different one of the fuel/air openings 218. It will be appreciated that that the combustor assembly 114 may, in some embodiments, include different types of fuel injector assemblies 222. For example, the combustor assembly 114 may include both main fuel injector assemblies and pilot fuel injector assemblies.

Regardless of the number and type of fuel injector assemblies 222, each includes a fuel injector 224 and a swirler assembly 226, and one or more of the fuel injector assemblies 222 includes a bistable fluidic amplifier 228. The fuel injector 224 is mounted within a fuel inlet port 232 that is formed in the swirler assembly 226, and is in fluid communication with a non-illustrated fuel source. The fuel injector 224, as is generally known, supplies a spray of fuel into the swirler assembly 226. The spray of fuel is mixed with air in the swirler assembly 226 to form a fuel/air mixture. The fuel/air mixture is in turn supplied to the combustion chamber 216, where it is ignited by one or more non-illustrated igniters.

The swirler assembly 226 includes an inner swirler 234, and an outer swirler 236 that surrounds the inner swirler 234. In the depicted embodiment, the swirler assembly 226 additionally includes a plurality of radial inflow swirlers 238—a first radial inflow swirler 238-1 and a second radial inflow swirler 238-2. The first and second radial inflow swirlers 238-1, 238-2 are each in fluid communication with the compressor section 104 and receive a flow of the compressed air supplied from the compressor section 104. The radial inflow swirlers 238, as is generally known, are configured to shape the compressed air that flows therethrough into a generally circular flow pattern to, among other things, assist in rapidly mixing the fuel and air to improve combustion of the fuel/air mixture upon exit from the fuel injector assembly 222. It should be noted that although the depicted fuel injector assemblies 222 are configured with radial inflow swirlers 238, the fuel injector assemblies 222 could be implemented using one of any number of different configurations including, but not limited to, axial swirlers, hybrid designs, or the like.

Figure 3:
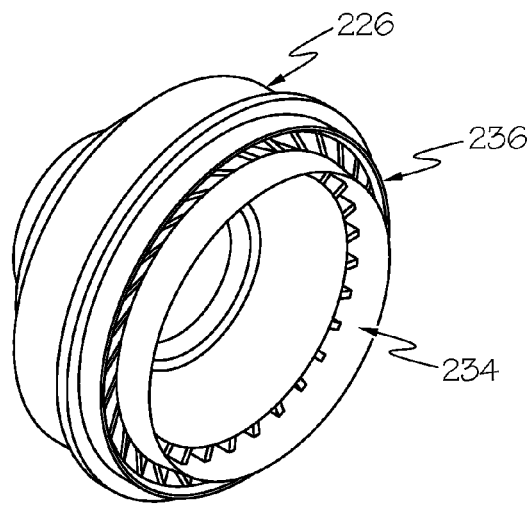
FIGS. 3-5 depict plan, cross section, and front views, respectively, of one embodiment of a swirler assembly that may be used to implement the combustor assembly of FIG. 2.
Figure 4:
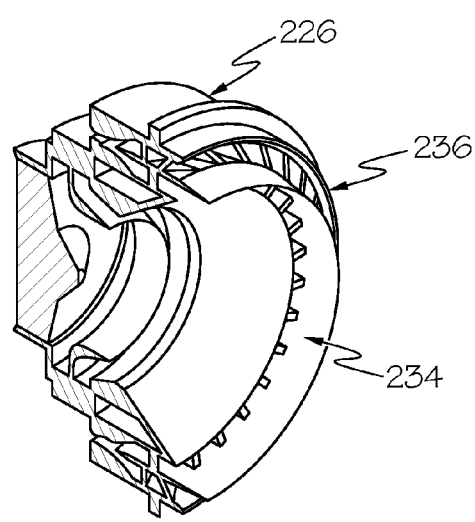
Figure 5:
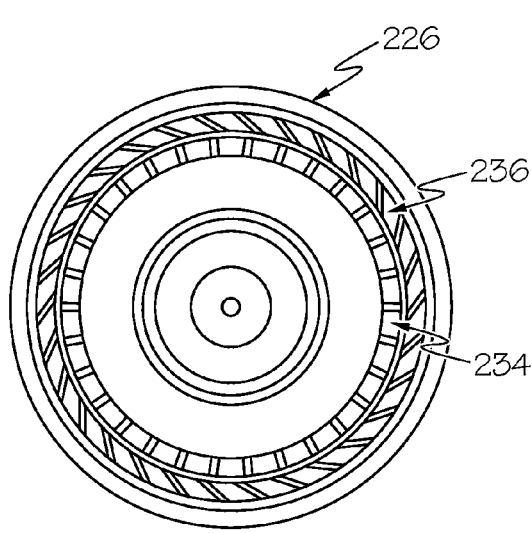

The inner swirler 234 and the outer swirler 236 are also configured to shape the flow of compressed air that flows there-through. The inner swirler 234 and outer swirler 236 are, however, optimized for different operational power levels of the gas turbine engine 100. In particular, the inner swirler 234 is optimized for relatively high-power operation, whereas the outer swirler 236 is optimized for relatively low-power operation. The operational power levels that define "high-power operation" and "low-power operation" may vary from engine-to-engine. In one embodiment, however, high-power operation is operations at or above idle conditions (e.g., ≥7% power), and low-power operation is operations below idle conditions (e.g., ignition and sub-idle (<7%)). Although the swirler assembly 226 may be variously configured and implemented to provide the functionality described herein, for completion, three different views of one embodiment of swirler assembly 226 are depicted in FIGS. 3-5.

Returning once again to FIG. 2, because the inner swirler 234 and outer swirler 236 are, as described above, optimized for different power levels, it is preferable, in at least some of the fuel injector assemblies 222, to be able to control the flow of compressed air through the inner swirler 234 and outer swirler 236 based on the relative power level of the engine 100. This functionality is provided by the bistable fluidic amplifier 228. The bistable fluidic amplifier 228 includes an air inlet 242, a first air outlet 244-1, a second air outlet 244-2, and a control port 246. The air inlet 242 is coupled to receive the flow of compressed air from the compressor section 102. The first air outlet 244-1 is in fluid communication with the air inlet 242 and the outer swirler 236, the second air outlet 244-2 in fluid communication with the air inlet 242 and the inner swirler 234, and the control port 246 is coupled to selectively receive a flow of control air. Before proceeding further, it should be noted that all of the fuel injector assemblies 222 may include a bistable fluidic amplifier 228, or only one or more of the fuel injector assemblies 222 may include a bistable fluidic amplifier 228.

The bistable fluidic amplifier 228 is responsive to control air pressure at the control port 246 to selectively direct the flow of compressed air supplied to the air inlet 242 to either the first air outlet 244-1, and thus the outer swirler 236, or the second air outlet 244-2, and thus the inner swirler 234. The bistable fluidic amplifier 228 is configured to direct the flow of compressed air supplied to the air inlet 242 to the outer swirler 236 from start-up operations through sub-idle operations, to meet initial ignition requirements when compressed air flow is relatively low. The bistable fluidic amplifier 228 is additionally configured to direct the flow of compressed air that is supplied to the air inlet 242 to the inner swirler 234 at steady state engine operations, when compressed air flow speed is relatively high.

The means by which the control air pressure at the control port 246 of the bistable fluidic amplifier 228 is controlled, in order to implement the above-described functionality, may vary. Some exemplary means are depicted in FIGS. 6-12, and will now be described, beginning first with the embodiment depicted in FIGS. 6 and 7.

Figure 6:
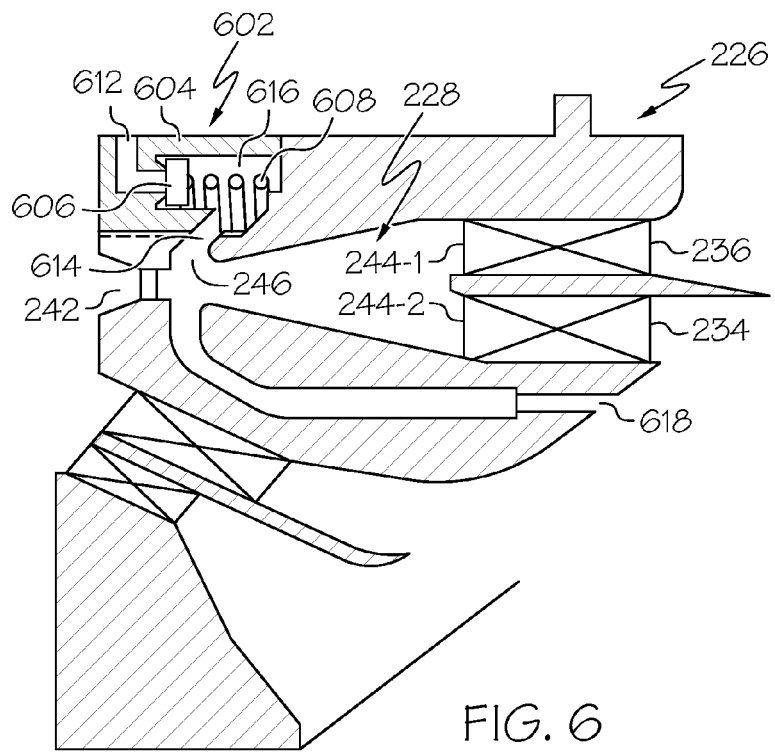
FIGS. 6 and 7 depict a cross section of a portion of a combustor assembly that includes one embodiment of a means for controlling a bistable fluidic amplifier to switch between different swirlers.
Figure 7:
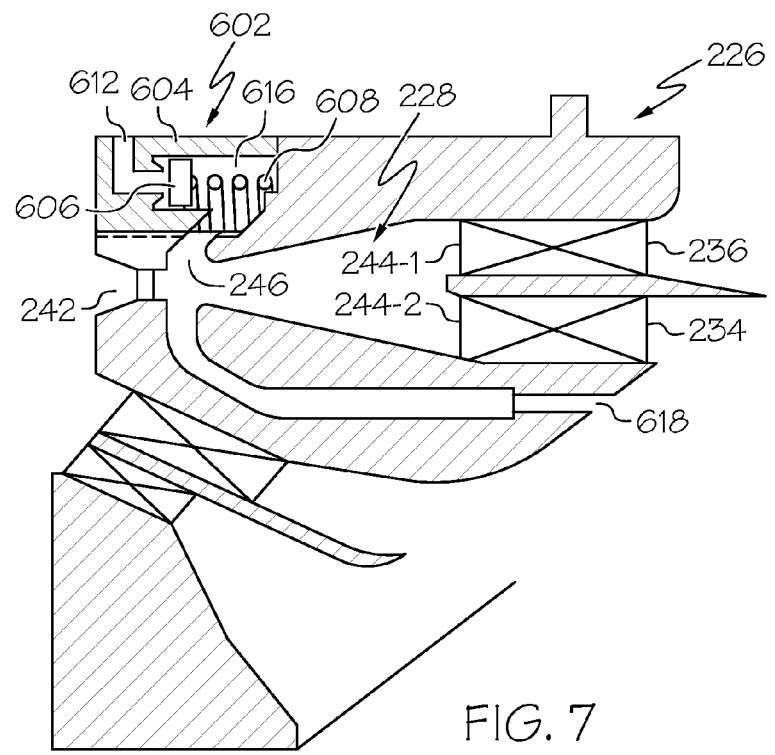

In the embodiment depicted in FIGS. 6 and 7, the combustor assembly 114 includes a single poppet valve 602, though it will be appreciated that in other embodiments the combustor assembly 114 could include a plurality of poppet valves 602. The poppet valve 602 is associated with all of the bistable fluidic amplifiers 228, and is thus associated with, and in fluid communication with, each of the control ports 246. The poppet valve 602 is configured to selectively supply the flow of control air to the control ports 246. To do so, at least in the depicted embodiment, the poppet valve 602 includes a valve body 604, a poppet 606, and a spring 608. The valve body 604, which in the depicted embodiment is formed integrally with the swirler assembly 226, includes a control air inlet port 612, a control air outlet port 614, and a control air flow passage 616 between the control air inlet port 612 and the control air outlet port 614. The poppet 606 is disposed within the control air flow passage 616, and is selectively movable between a closed position, which is the position depicted in FIG. 6, and an open position, which is the position depicted in FIG. 7. The spring 608 is disposed within the valve body 604 and supplies a bias force to the poppet 606 that urges the poppet 606 toward the closed position.

With the embodiment depicted in FIGS. 6 and 7, at relatively low-power operations (e.g., start-up and sub-idle conditions) of the engine 100, the differential pressure across the swirler assembly 226 is relatively low. This relatively low differential pressure is insufficient to overcome the bias force supplied by the spring 608. Thus, the poppet 606 remains in the closed position. The bistable fluidic amplifiers 228 are configured such that the flow of compressed air supplied to each air inlet 242 is initially directed toward the first air outlet 244-1. The manner in which the bistable fluidic amplifiers 228 are configured to implement this functionality may vary, but in the depicted embodiment a portion of the air inlet 242 is angled toward the first air outlet 244-1. This angle may vary, but in one embodiment an angle of about 4-degrees is used. As a result, the flow of compressed air supplied to the air inlet 242 will initially flow through the outer swirler 236.

Thereafter, when the engine 100 is operating at a relatively high power (e.g., idle to full power), the differential pressure across the swirler assembly 226 will be sufficient to overcome the bias force supplied by the spring 608. Thus, the poppet 606 will move to the open position. As a result, compressed air, which is also supplied to the control air inlet port 612, will flow into and through the control air flow passage 616, through the control air outlet port 614, and into the control ports 246 of the bistable fluidic amplifiers 228. This compressed air, which functions as control air, will cause the flow of compressed air supplied to the air inlets 242 to now be directed toward the associated second air outlets 244-2. As a result, the flow of compressed air supplied to each air inlet 242 now flows through the associated inner swirlers 234.

As FIGS. 6 and 7 further depict, each bistable fluidic amplifier 228 in this embodiment may additionally include one or more vent ports 618 (only one depicted). The one or more vent ports 618 are disposed downstream of the air inlet 242, and each is in fluid communication with the combustion chamber 216. The vent port(s) 618, if included, provide for fine adjustment, as needed, to meet performance requirements. It will be appreciated that the size and number of vent ports 618 may be adjusted to compensate for manufacturing tolerances.

It may additionally be seen that the control air inlet port 612 is preferably disposed perpendicular to the air inlet 242.

As a result, any particulate that may be present in the compressed air will not turn flow into the control air inlet port 612. Instead, such particulate will be swept past the control air inlet port 612, and exit the engine 100. Preventing, or at least substantially inhibiting particulate from flowing into the control air inlet port 612, will significantly reduce the likelihood of fouling of the poppet valve 606.

Figure 8:
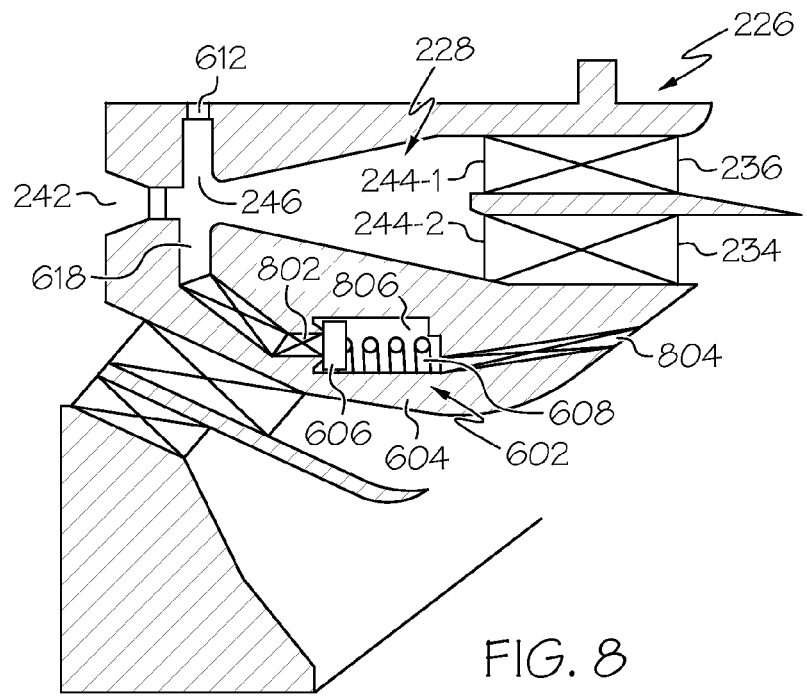
FIGS. 8 and 9 depict a cross section of a portion of a combustor assembly that includes an second embodiment of a means for controlling a bistable fluidic amplifier to switch between different swirlers.
Figure 9:
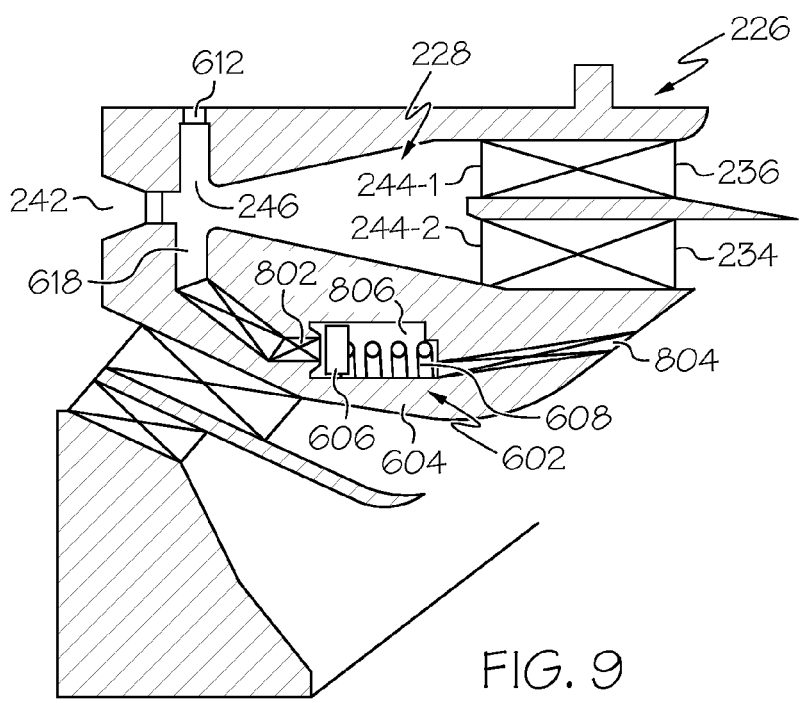

Turning now to FIGS. 8 and 9, another embodiment will be described. In this embodiment, the combustor assembly 114 also includes a single poppet valve 602, though it too could include a plurality of poppet valves 602. Nonetheless, the poppet valve 602 is associated with each of the bistable fluidic amplifiers 228. In this embodiment, however, the poppet valve 602 is in fluid communication with each of the vent ports 618 rather than each of the control ports 246, and the poppet valve 602 is configured to selectively allow the flow of control air through the control ports 246. As with the previously described embodiment, the poppet valve 602 includes a valve body 604, a poppet 606, and a spring 608. The valve body 604, which in the depicted embodiment is formed integrally with the swirler assembly 226, includes a vent air inlet port 802, a vent air outlet port 804, and a vent air flow passage 806 between the vent air inlet port 802 and the vent air outlet port 804. The poppet 606 is disposed within the vent air flow passage 806, and is selectively movable between a closed position, which is the position depicted in FIG. 8, and an open position, which is the position depicted in FIG. 9. The spring 608 is disposed within the valve body 604 and supplies a bias force to the poppet 606 that urges the poppet 606 toward the closed position.

The embodiment depicted in FIGS. 8 and 9 operates similarly to the one depicted in FIGS. 6 and 7. Thus, at relatively low-power operations (e.g., start-up and sub-idle conditions) of the engine 100, the differential pressure across the swirler assembly 226 is relatively low. This relatively low differential pressure is insufficient to overcome the bias force supplied by the spring 608. Thus, the poppet 606 remains in the closed position. The bistable fluidic amplifiers 228 are configured such that the flow of compressed air supplied to the air inlets 242 is initially directed toward the first air outlets 244-1. The manner in which the bistable fluidic amplifier 228 is configured to implement this functionality may vary, but in the depicted embodiment a portion of the air inlets 242 is angled toward the first air outlet 244-1. This angle may vary, but in one embodiment an angle of about 4-degrees is used. As a result, the flow of compressed air supplied to the air inlets 242 will initially flow through the associated outer swirler 236.

Thereafter, when the engine 100 is operating at a relatively high power (e.g., idle to full power), the differential pressure across the swirler assembly 226 will sufficiently to overcome the bias force supplied by the spring 608. Thus, the poppet 606 will move to the open position. As a result, each vent port 618 is in fluid communication with the associated vent air outlet port 804, and suction flow from the vent ports 618 to the vent air outlet port will cause the flow of compressed air supplied to the air inlets 242 to now be directed toward the associated second air outlets 244-2. As a result, the flow of compressed air supplied to the air inlets 242 now flows through the associated inner swirlers 234.

In the embodiment of FIGS. 6 and 7, fine adjustment was provided via the one or more vent ports 618. With the embodiment of FIGS. 8 and 9, such adjustment is provided via the control air inlet port 612. It may thus be appreciated that the size and number of control ports 612 may be adjusted to compensate for manufacturing tolerances. Consistent with the embodiment of FIGS. 6 and 7, the control air inlet port(s) 612 is (are) preferably disposed perpendicular to the air inlet 242 so that any particulate that may be present in the compressed air will not turn flow into the control air inlet port(s) 612.

Figure 10:
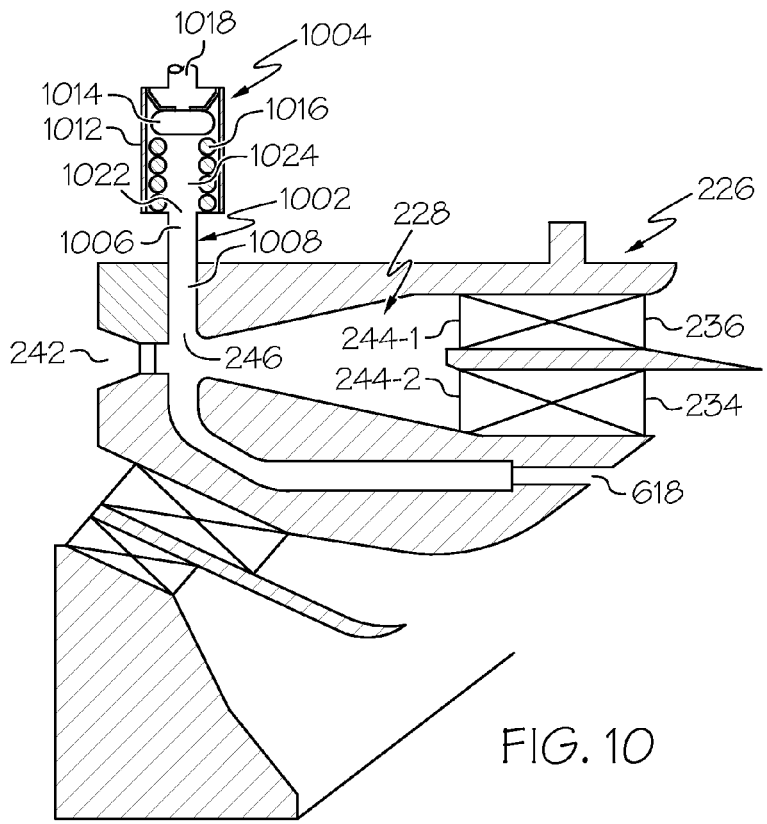
FIGS. 10 and 11 depict a cross section of a portion of a combustor assembly that includes a third embodiment of a means for controlling a bistable fluidic amplifier to switch between different swirlers.
Figure 11:
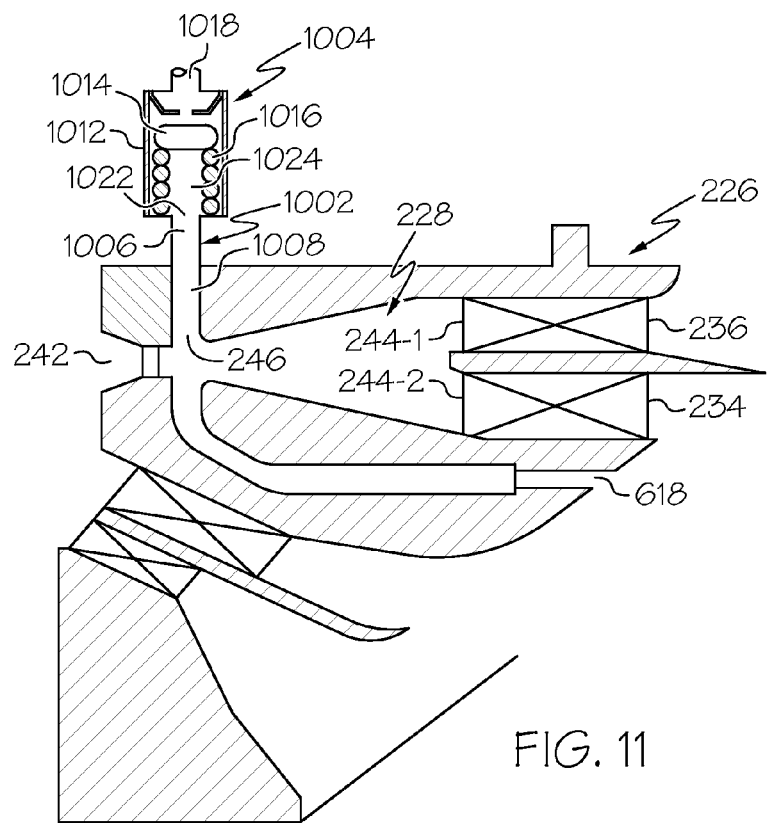

Referring now to FIGS. 10 and 11, yet another embodiment will be described. In this embodiment, the engine 100 includes a manifold 1002 and a poppet valve 1004. The manifold 1002 includes a control air inlet port 1006 and a plurality of control air outlet ports 1008 (only one depicted in FIGS. 10 and 11. Each of the control air outlet ports 1008 is associated with, and is in fluid communication with, a different one of the control ports 246.

The poppet assembly 1004 is in fluid communication with the control air inlet port 1006 and is configured to selectively supply the flow of control air thereto. As with the previously described embodiments, the poppet valve 1004 includes a valve body 1012, a poppet 1014, and a spring 1016. The valve body 1012 includes a control air inlet port 1018, a control air outlet port 1022, and a control air flow passage 1024 between the control air inlet port 1018 and the control air outlet port 1024. The poppet 1014 is disposed within the control air flow passage 1024, and is selectively movable between a closed position, which is the position depicted in FIG. 10, and an open position, which is the position depicted in FIG. 11. The spring 1016 also is disposed within the control air flow passage 1024 and supplies a bias force to the poppet 1014 that urges the poppet 1014 toward the closed position.

With the embodiment depicted in FIGS. 10 and 11, at relatively low-power operations (e.g., start-up and sub-idle conditions) of the engine 100, the differential pressure across the swirler assembly 226 is relatively low. This relatively low differential pressure is insufficient to overcome the bias force supplied by the spring 1016. Thus, the poppet 1014 remains in the closed position. The bistable fluidic amplifier 228 is configured such that the flow of compressed air supplied to the air inlet 242 is initially directed toward the first air outlet 244-1. The manner in which the bistable fluidic amplifier 228 is configured to implement this functionality may vary, but in the depicted embodiment a portion of each air inlet 242 is angled toward the associated first air outlet 244-1. This angle may vary, but in one embodiment an angle of about 4-degrees is used. As a result, the flow of compressed air supplied to the air inlets 242 will initially flow through the associated outer swirlers 236.

Thereafter, when the engine 100 is operating at a relatively high power (e.g., idle to full power), the differential pressure across the swirler assembly 226 will sufficiently to overcome the bias force supplied by the spring 1016. Thus, the poppet 1014 will move to the open position. As a result, compressed air, which is also supplied to the control air inlet port 1018, will flow into and through manifold 1002, via the control air inlet port 1006 and the plurality of control air outlet ports 1008, and into the control ports 246 of the bistable fluidic amplifiers 228. This compressed air, which functions as control air, will cause the flow of compressed air supplied to the air inlets 242 to now be directed toward the associated second air outlets 244-2. As a result, the flow of compressed air supplied to the air inlets 242 now flows through the associated inner swirlers 234.

As with the embodiment of FIGS. 6 and 7, each bistable fluidic amplifier 228 in this embodiment may additionally include one or more vent ports 618 (only one depicted) disposed downstream of the air inlet 242 and in fluid communication with the combustion chamber 216. The vent port(s) 618, if included, provide for fine adjustment, as needed, to meet performance requirements. It will be appreciated that the size and number of vent ports 618 may be adjusted to compensate for manufacturing tolerances.

Before proceeding with describing another embodiment, it will be appreciated that the embodiment depicted in FIGS. 10 and 11 could be implemented with a plurality of the poppet assemblies 1004, rather than a single poppet assembly 1004. In such an embodiment, each poppet assembly 1004 would be associated with a different one of the swirler assemblies 226. Accordingly, such an embodiment would not include the manifold 1002.

Figure 12:
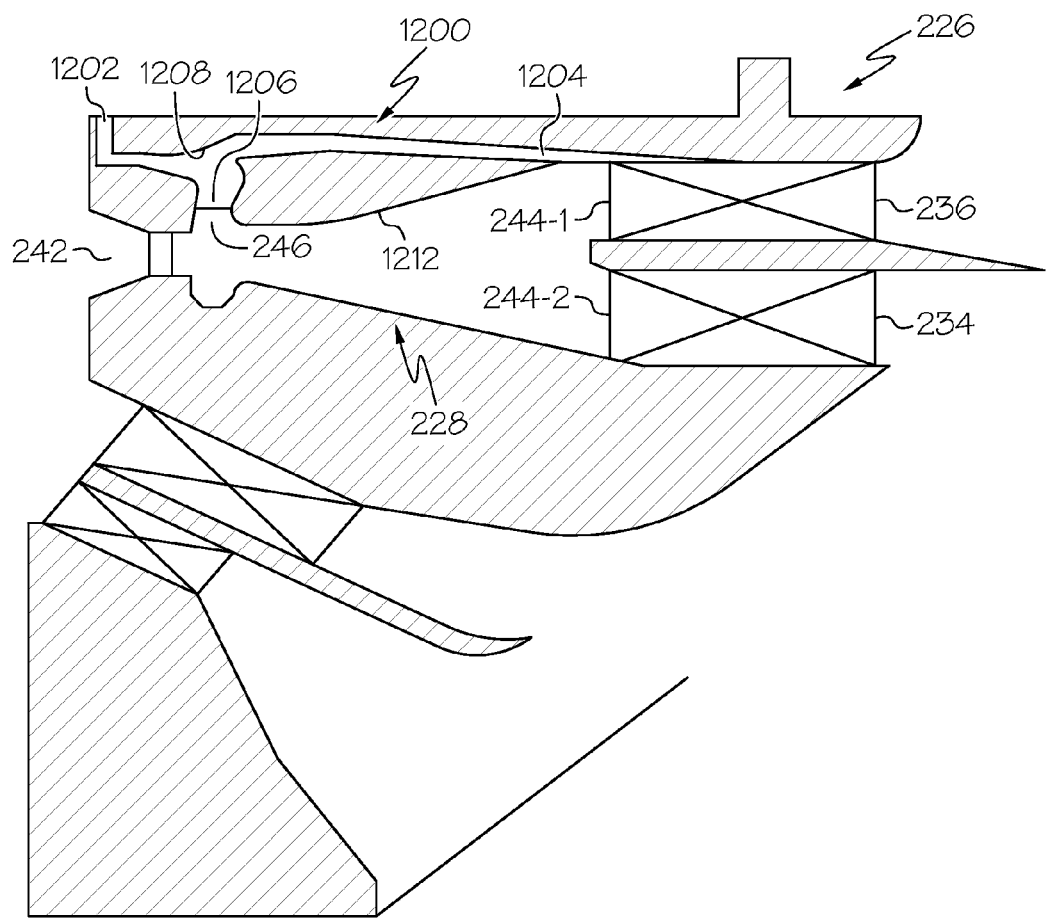
FIG. 12 depict a cross section of a portion of a combustor assembly that includes a fourth embodiment of a means for controlling a bistable fluidic amplifier to switch between different swirlers.

Turning now to FIG. 12, one final alternative embodiment will be described. In this embodiment, each of the previously described bistable fluidic amplifiers 228 is a main stage bistable fluidic amplifier, and the engine further includes a plurality of pilot stage bistable fluidic amplifiers 1200 (only one depicted). Each of the pilot stage bistable fluidic amplifiers 1200 is associated with a different one of the main stage bistable fluid amplifiers 228, and includes a pilot air inlet 1202, a pilot air outlet 1204, and a control air outlet 1206. The pilot air inlet 1202 is coupled to receive the flow of control air. The pilot air outlet 1204 is in fluid communication with the pilot air inlet 1202 and the outer swirler 236. The control air outlet 1206 is in fluid communication with the pilot air inlet 1202 and the control port 246 of its associated main stage bistable fluidic amplifier 228. With this embodiment, each pilot stage bistable fluidic amplifier 1200 is responsive to control air pressure at the pilot air inlet 1202 to selectively direct the flow of control air to either the pilot air outlet 1204 or the control air outlet 1206.

It is noted that the outer walls 1212 of each of the main stage bistable fluidic amplifiers 228, and the outer walls 1208 of each of the pilot stage bistable fluidic amplifiers 1200 have a concave curvature toward inside diameter of the combustor assembly 114. As a result, the compressed air that enters the air inlet 242 and the pilot air inlet 1202 will detach at the curvature when the flow rate increases, thereby pushing flow toward the other side.

At relatively low-power operations (e.g., start-up and sub-idle conditions) of the engine 100, the differential pressure across the swirler assembly 226, and thus the flow rate of the compressed air, is relatively low. It is noted that the outer walls 1208 of each of the pilot stage bistable fluidic amplifiers 1200 have a concave curvature toward the inside diameter of the combustor assembly 114. As a result, compressed air supplied to the pilot air inlet 1202 is initially attached to the outer wall 1208 and directed toward the pilot air outlet 1204. In addition, the main stage bistable fluidic amplifier 228 is configured such that the flow of compressed air supplied to the air inlet 242 is initially directed toward the first air outlet 244-1. Again, the manner in which the bistable fluidic amplifier 228 is configured to implement this functionality may vary. In the depicted embodiment, this functionality is provided in two ways. First, as with the previous embodiments, a portion of the air inlet 242 is angled toward the first air outlet 244-1. Second, as with the pilot stage fluidic amplifiers 1200, the outer walls 1212 of each of the main stage bistable fluidic amplifiers 228 have a concave curvature toward the inside diameter of the combustor assembly 114. As a result, the flow of compressed air supplied to the air inlet 242 will initially flow through the outer swirler 236.

Thereafter, when the engine 100 is operating at a relatively high power (e.g., idle to full power), the pilot stage bistable fluidic amplifier 1200 will cause the flow of compressed air supplied to the pilot air inlet 1202 to be directed out the control air outlet 1206. In particular, the increased flow rate of compressed air at these power levels will cause the compressed air entering the pilot air inlet to detach from the concave downward outer wall 1208, and will also increase the suction pressure at the control port 246 of the main stage bistable fluidic amplifier 228. The compressed air directed out the control air outlet 1206, and thus into the control port of the main stage bistable fluidic amplifier 228 will push the compressed air entering the air inlet 242 toward the second air outlet 244-2. As a result, the flow of compressed air supplied to the air inlet 242 now flows through the inner swirler 234.

The systems described herein can modulate or mode-switch between two differently configured swirlers, each optimized for either high-power or low-power (e.g., sub-idle) operation, and provide air flow in the vicinity of the igniter during engine start up, and no flow in the vicinity of the igniter at steady state engine operations.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A gas turbine engine combustor assembly, comprising:
an inner annular liner, an outer annular liner spaced apart from the inner annular liner, and a dome assembly coupled between the inner and outer annular liner to define a combustion chamber;
fuel/air openings formed in and extending through the dome assembly;
swirler assemblies, each swirler assembly disposed within a different one of the fuel/air openings, each swirler assembly comprising an inner swirler and an outer swirler that surrounds the inner swirler;

a bistable fluidic amplifier comprising an air inlet, a first air outlet, a second air outlet, a vent port, and a control port, the air inlet adapted to receive a flow of compressed air, the first air outlet in fluid communication with the air inlet and one of the outer swirlers, the second air outlet in fluid communication with the air inlet and one of the inner swirlers, the vent port having a vent port inlet disposed upstream of the swirler assemblies, the vent port in fluid communication with the air inlet, the control port, and the combustion chamber, the control port adapted to selectively receive a flow of control air; and a poppet valve in fluid communication with the control port, the poppet valve responsive to differential fluid pressure across the swirler assemblies to selectively supply a flow of control air to the control port, wherein the bistable fluidic amplifier is responsive to control air pressure at the control port to selectively direct the flow of compressed air supplied to the air inlet to either the first air outlet or the second air outlet.

2. The gas turbine engine combustor assembly of claim 1, wherein the poppet valve comprises:

a valve body including a control air inlet port, a control air outlet port, and a control air flow passage between the control air inlet port and the control air outlet port;

a poppet disposed within the control air flow passage and selectively movable between a closed position and an open position; and a spring disposed within the valve body and supplying a bias force to the poppet that urges the poppet toward the closed position.

3. A gas turbine engine combustor assembly, comprising:
an inner annular liner, an outer annular liner spaced apart from the inner annular liner, and a dome assembly coupled between the inner and outer annular liners to define a combustion chamber;

fuel/air openings formed in and extending through the dome assembly;

swirler assemblies, each swirler assembly disposed within a different one of the fuel/air openings, each swirler assembly comprising an inner swirler and an outer swirler that surrounds the inner swirler;

a bistable fluidic amplifier comprising an air inlet, a first air outlet, a second air outlet, a control port, and a vent port, the air inlet adapted to receive a flow of compressed air, the first air outlet in fluid communication with the air inlet and one of the outer swirlers, the second air outlet in fluid communication with the air inlet and one of the inner swirlers, the control port adapted to selectively receive a flow of control air, the vent port having a vent port inlet disposed upstream of the swirler assemblies, the vent port in fluid communication with the air inlet, the control port, and the combustion chamber; and a poppet valve in fluid communication with the vent port, the poppet valve responsive to differential fluid pressure across the swifter assemblies to selectively control a flow of control air to the control port, wherein the bistable fluidic amplifier is responsive to control air pressure at the control port to selectively direct the flow of compressed air supplied to the air inlet to either the first air outlet or the second air outlet.

4. The gas turbine engine combustor assembly of claim 3, wherein the poppet valve comprises:

a valve body including a vent air inlet port, a vent air outlet port, and a vent air flow passage between the vent air inlet port and the vent air outlet port;

a poppet disposed within the vent air flow passage and selectively movable between a closed position and an open position; and a spring disposed within the valve body and supplying a bias force to the poppet that urges the poppet toward the closed position.

5. A gas turbine engine combustor assembly, comprising:
an inner annular liner, an outer annular liner spaced apart from the inner annular liner, and a dome assembly coupled between the inner and outer annular liner to define a combustion chamber;

fuel/air openings formed in and extending through the dome assembly;

swirler assemblies, each swirler assembly disposed within a different one of the fuel/air openings, each swirler assembly comprising an inner swirler and an outer swirler that surrounds the inner swirler;

a main stage bistable fluidic amplifier comprising an air inlet, a first air outlet, a second air outlet, and a control port, the air inlet adapted to receive a flow of compressed air, the first air outlet in fluid communication with the air inlet and one of the outer swirlers, the second air outlet in fluid communication with the air inlet and one of the inner swirlers, the control port adapted to selectively receive a flow of control air; and a pilot stage bistable fluidic amplifier associated with the main stage bistable fluid amplifier, the pilot stage bistable fluidic amplifier comprising a pilot air inlet, a single pilot air outlet, and a control air outlet, the pilot air inlet adapted to receive the flow of control air, the single pilot air outlet in fluid communication with the pilot air inlet and the outer swirler, the control air outlet in fluid communication with the pilot air inlet and the control port, wherein:

the bistable fluidic amplifier is responsive to control air pressure at the control port to selectively direct the flow of compressed air supplied to the air inlet to either the first air outlet or the second air outlet, and the pilot stage bistable fluidic amplifier is responsive to control air pressure at the pilot air inlet to selectively direct the flow of control air to either the pilot air outlet or the control air outlet.

* * * * *